(12) United States Patent
Duplessis et al.

(10) Patent No.: US 8,810,576 B2
(45) Date of Patent: Aug. 19, 2014

(54) MANIPULATION AND MANAGEMENT OF LINKS AND NODES IN LARGE GRAPHS

(75) Inventors: Jean-Pierre Duplessis, Redmond, WA (US); Christopher J. Lovett, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 12/758,816

(22) Filed: Apr. 13, 2010

(65) Prior Publication Data

US 2011/0249002 A1  Oct. 13, 2011

(51) Int. Cl.
*G06T 11/20* (2006.01)

(52) U.S. Cl.
USPC ........................................................ 345/440

(58) Field of Classification Search
USPC ........................................................ 345/440
See application file for complete search history.

(56) References Cited

U.S. PATENT DOCUMENTS

| | | | |
|---|---|---|---|
| 5,515,487 A * | 5/1996 | Beaudet et al. | 345/440 |
| 5,999,192 A * | 12/1999 | Selfridge et al. | 345/440 |
| 6,226,787 B1 | 5/2001 | Serra et al. | |
| 6,259,458 B1 * | 7/2001 | Theisen et al. | 345/440 |
| 6,356,285 B1 * | 3/2002 | Burkwald et al. | 715/853 |
| 6,774,899 B1 | 8/2004 | Ryall et al. | |
| 6,900,807 B1 * | 5/2005 | Liongosari et al. | 345/440 |
| 6,952,208 B1 | 10/2005 | Arquie et al. | |
| 6,972,762 B2 | 12/2005 | Ben-Tovim et al. | |
| 7,055,130 B2 * | 5/2006 | Charisius et al. | 717/108 |
| 7,493,320 B2 * | 2/2009 | Canright et al. | 707/5 |
| 7,593,013 B2 * | 9/2009 | Agutter et al. | 345/440 |
| 7,606,168 B2 * | 10/2009 | Robinson et al. | 370/254 |
| 2003/0011601 A1 * | 1/2003 | Itoh et al. | 345/440 |
| 2003/0018652 A1 | 1/2003 | Heckerman et al. | |
| 2008/0304743 A1 | 12/2008 | Tang et al. | |
| 2009/0058857 A1 * | 3/2009 | Ballantyne | 345/440 |
| 2009/0115785 A1 | 5/2009 | Grandhi et al. | |

OTHER PUBLICATIONS

"Advanced Layout Concepts:", Retrieved at << http://www.yworks.com/products/yfiles/doc/developers-guide/layout_advanced_features.html >>, 2010.

* cited by examiner

*Primary Examiner* — Xiao Wu
*Assistant Examiner* — Charles Tseng
(74) *Attorney, Agent, or Firm* — Kevin Sullivan; Kate Drakos; Micky Minhas

(57) ABSTRACT

Scalable architecture for managing and rendering a large graph containing a large number of nodes and edges. The user can group arbitrary nodes to encapsulate complexity without losing any of the cross-group edges dependencies. All edges of the nodes contained in the group are rolled up into roll-up links (or "arteries") where the graphical thickness indicates relatively how many links are bundled. By collapsing groups the entire view gives the user a clearer understanding of the graph. Information related to the groups and links is retained for drill-into to obtain the details inside each group on the same canvas and for user navigation across groups.

19 Claims, 11 Drawing Sheets

MANIPULATION AND MANAGEMENT OF LINKS AND NODES IN LARGE GRAPHS

BACKGROUND

It is relatively easy to store vast amounts of information; however, the ability to gain an understanding of what that shows is becoming difficult. For example, graphs are one visual technique employed for trying to understand the data and data interdependencies. However, again, these graphs can grow to enormous size in the area of thousands to millions of nodes and node links, thereby reintroducing a problem of viewing and interacting with such large representations. These large graphs need to be reducible not only to a manageable size but also for user understanding.

Existing systems limit the amount of detail available to the user so the user can only visualize a part of the overall system at a time. For example, some call-dependency browsers show only one level of calls at a given time, which scales but causes the user to get lost in the details. Moreover, existing systems require that the user perform undue work to provide a "logical mapping" from the data source to the diagrams so that the diagram removes irrelevant detail. Still other techniques provide non-graphical tabular data. No scalable architectures exist to allow the user to interactively explore a graphical visualization of a large graph and drill into to see details while also not losing sight of the big picture.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a scalable technique for interacting with large graphs that can include node counts and edge dependencies (also referred to generally as "links") in the hundreds, thousands, and with sufficient grouping even into the millions. The user can now obtain an overall view of the nodes and links, and then drill into the representations (groups, roll-up links, etc.) to get the desired information. The architecture provides a view (user interface) of grouping and roll-up of edges into a scaled roll-up link (or "artery"). Cross-group detail is also provided for selected nodes. The architecture also provides an interactive graph layout where the user can incrementally navigate through the nodes, node groups, and links. A link navigator tool enables the user to jump around the graph even when nodes are grouped and groups are collapsed. Additionally, navigation history is tracked and provided that can retrace user steps back through the graph.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture provides a scalable technique for interacting with large graphs that can include node counts and edge dependencies (also referred to generally as "links") in the hundreds, thousands, and even more, for example. The user can now obtain an overall view of the nodes and links, and then drill into the representations (groups, roll-up links, etc.) to get the desired information.

The architecture provides a view (user interface) of grouping and roll-up of edges into a scaled roll-up link (or "artery"). Recursive grouping is supported. Cross-group detail is also provided for selected nodes. The architecture also provides an interactive graph layout where the user can incrementally navigate through the nodes, node groups, and links. A link navigator tool enables jumping around the graph even when nodes are grouped and groups are collapsed.

When collapsing nodes into groups and links into rolled-up links, no information is lost such that expansion properly presents the link dependencies for all nodes as occurred before the collapse operation.

Figure 3:
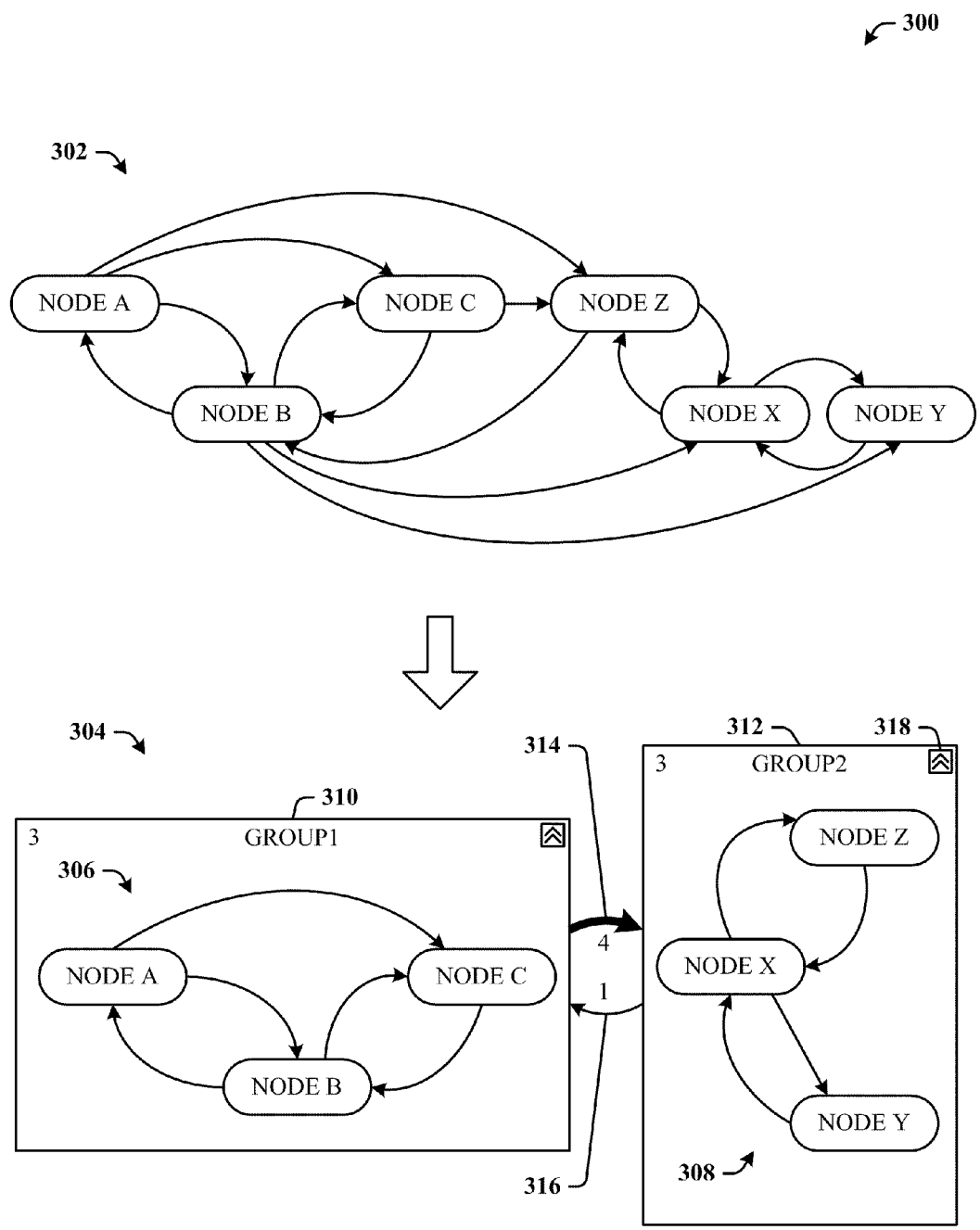
FIG. 3 illustrates scaled views of a graph that is scaled into groups and consolidated links.

Consider the graph 302 and scaled view 304 of FIG. 3, the nodes can be grouped thereby providing a visual graph representation that is intuitively cleaner since all links that cross over the groups are automatically hidden and replaced with two new "arteries" connecting the groups Group1 and Group2. These arteries convey that there are dependencies between these two groups and the thickness of the artery conveys how many dependencies exist in a given direction. Notice that roll-up link 314 from Group1 to Group2 is thinner then the link 316 from Group2 to Group1. This indicates that there are more dependencies flowing from nodes inside Group1 to Group2 than in the reverse direction.

The user can choose to hide complexity further by collapsing the groups (FIG. 4), which hides all the nodes inside the group. This technique makes a graph with thousands or millions of nodes visually approachable for the first time. The architecture still retains the graph details of all the cross-group edges and thus can overlay that information on the graph when the user selects a specific node (FIG. 5).

Figure 6:
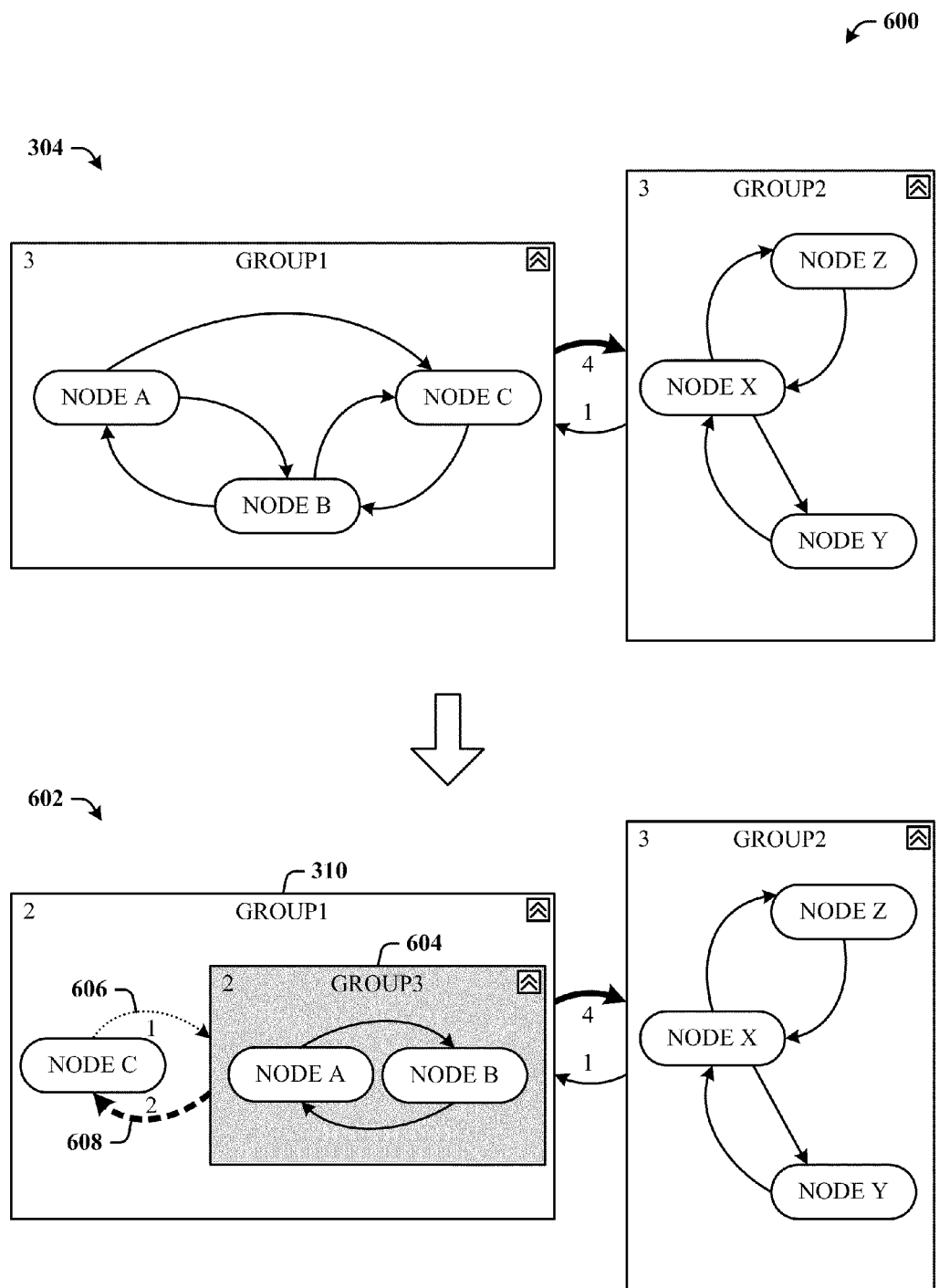
FIG. 6 illustrates a view of nested grouping.
Figure 7:
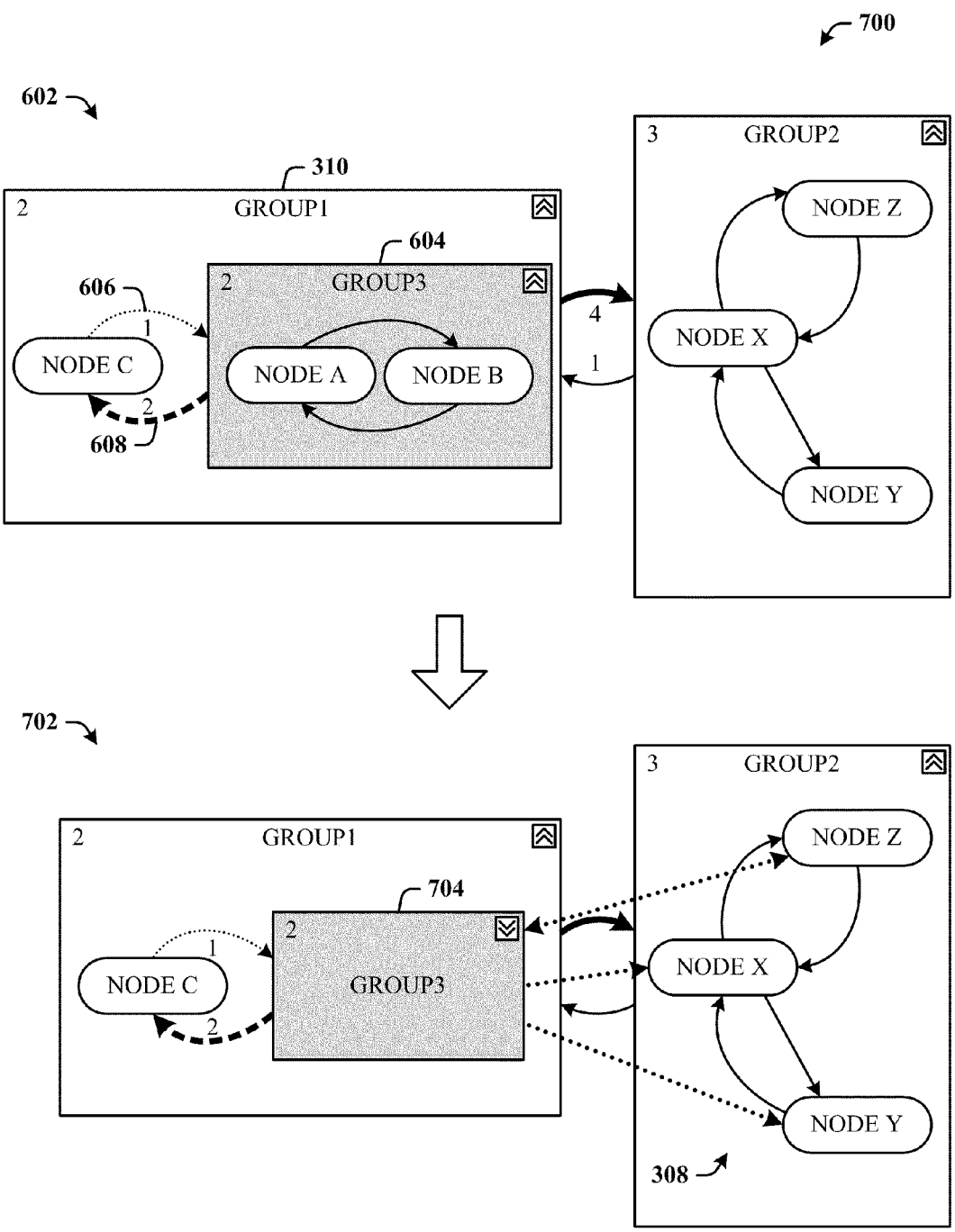
FIG. 7 illustrates a scaled view of a collapsed nested group and overlayed links.

Another feature of the scalability is that groups can be nested inside other groups (FIG. 6), and the nested groups can be further collapsed (FIG. 7). In FIG. 7, the current view indicates that Group3 has nodes that are dependent on nodes C, Z, X and Y.

Moreover, the link navigator tool facilitates the ability to quickly navigate to collapsed content, incrementally updating the graph layout to show that content as quickly as possible. Additionally, navigation history is tracked and provided that can retrace user steps back through the graph.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
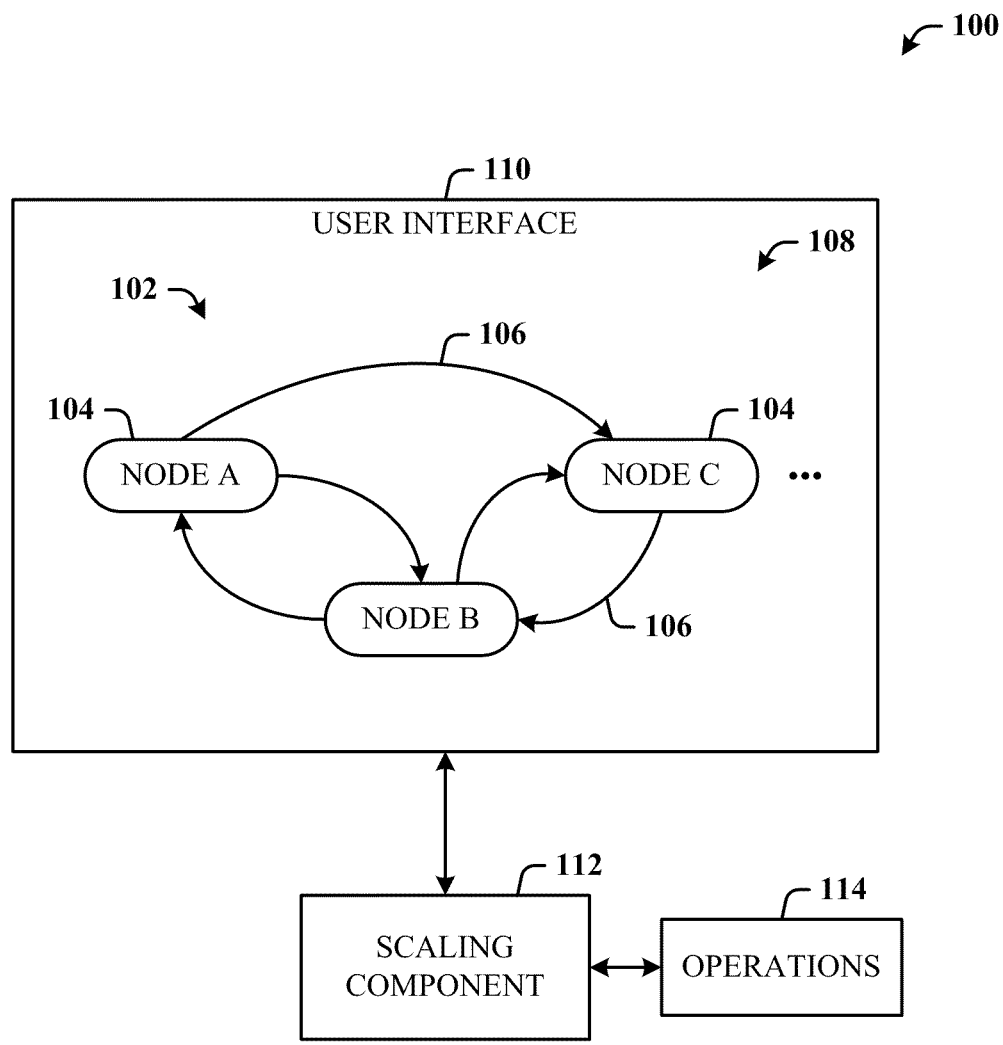
FIG. 1 illustrates a graph visualization system in accordance with the disclosed architecture.

FIG. 1 illustrates a graph visualization system 100 in accordance with the disclosed architecture. The system 100 includes a graph 102 presented as an arrangement of nodes 104 and links 106 between nodes 104 visually represented in a view 108 via a user interface 110. The graph 102 is different from a tree in that a tree is based on nodes having parent-child relationships, whereas the graph 102 includes links such as forward links and/or back links in any nodal relationship. A scaling component 112 incrementally scales the view 108 of the graph 102 based on operations 114 on the nodes 104 and the links 106. The operations 114 include collapse of nodes 104 into groups and links 106 into roll-up links. The operations 114 also include expansion of the groups and the roll-up links.

The scaling component 112 graphically replaces links between a node and a group or between groups with a roll-up link that is presented with distinct presentation emphasis (e.g., bolding, heavier line weight than other link lines, color, line type, etc.) and an optional link count value which indicates that multiple links are represented by the roll-up link. The scaling component 112 associates a group of nodes with a group graphic that circumscribes the nodes, a group label, a node count value, and an expansion operator to expand the group of nodes. The scaling component 112 enables further collapse of the group of nodes into a box that hides the associated nodes, the box includes the group label, and associated links. The scaling component 112 also enables nested groups of nodes and groups, the nested group having a nested group label and associated roll-up link. The scaling component 112 presents cross-group links for nested node and groups.

Figure 2:
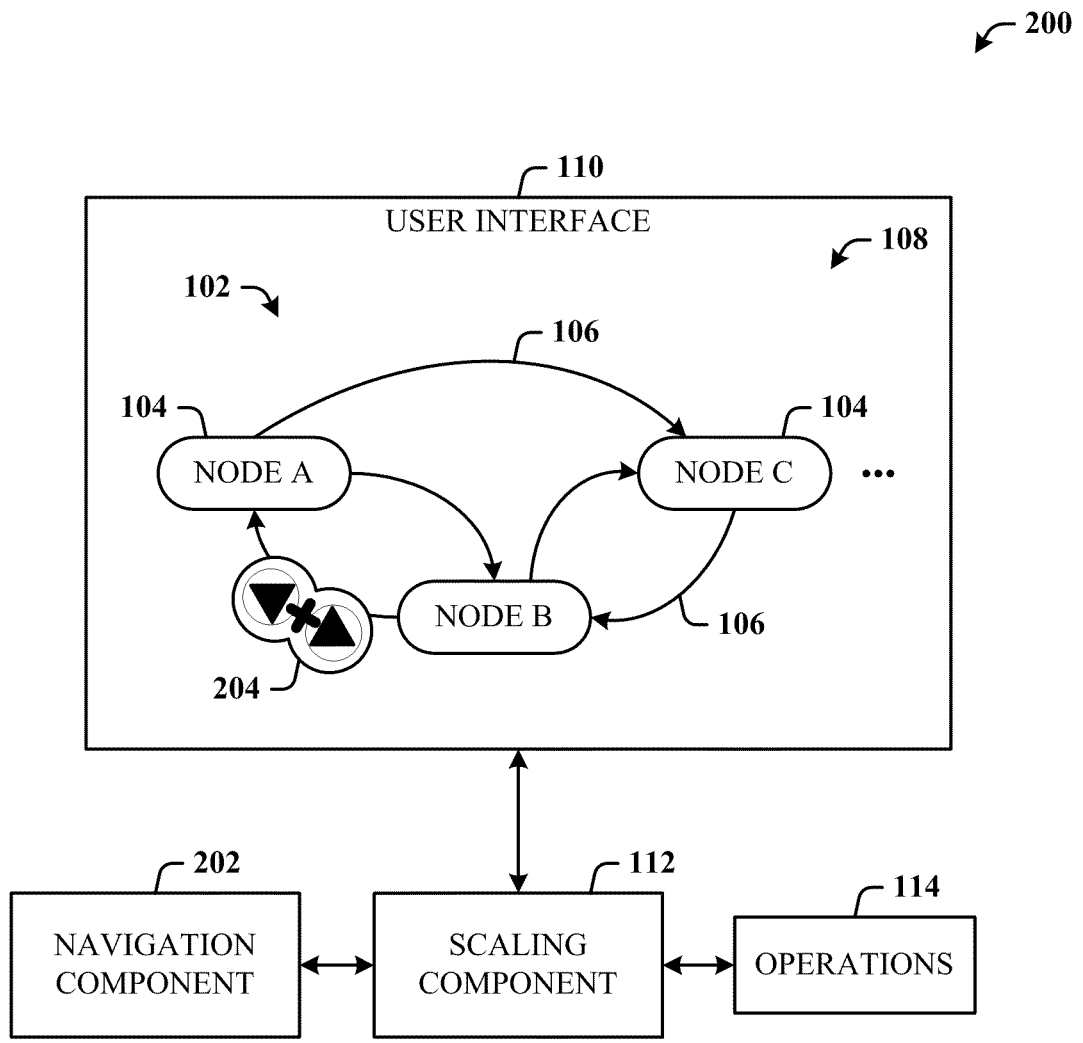
FIG. 2 illustrates an alternative embodiment of a graph visualization system that includes a navigation component that controls a navigation tool for interacting with the view to obtain details of nodes and links.

FIG. 2 illustrates an alternative embodiment of a graph visualization system 200 that includes a navigation component 202 that controls a navigation tool 204 for interacting with the view 108 to obtain details of nodes and links. Put another way, the graph 102 is presented as an arrangement of nodes 104 and links 106 between the nodes 104 visually represented via the user interface 110. The scaling component 112 incrementally scales the graph 102 based on operations 114 on the nodes and the links. The operations 114 include collapse of nodes into groups and links into roll-up links and expansion of the groups and the roll-up links. The navigation tool 204 facilitates incremental access to collapsed content and update of the graph 102 relative to exposed content. The navigation tool 204 facilitates exposure of only collapsed nodes and roll-up links relative to a selected node and creation of an updated visualization based on extraction of nodes and links relative to selection of a link or a node. The navigation tool can be used to expose the links associated with the roll-up link. For example, by hovering the tool over a roll-up link, link information for all links bundled roll-up link can be presented as a popup information panel.

Following is a more detailed description of visualization and interaction capabilities with the graph in accordance with the disclosed architecture.

FIG. 3 illustrates scaled views 300 of a graph 302 that is scaled into groups and consolidated links (or edge dependencies). In expanded mode, the graph 302 includes six nodes: nodes A, B, C, X, Y, and Z. The graph nodes include links that are forward links and back links. For example, node A includes forward links to node B, C and Z, and a back link from node B. Node B has forward links to node A, node C, node X and node Y, and back links from node A, node C and node Z. Node C has forward links to node B and node Z and back links from node A and node B. Node Z as forward links to node B and node X and back links from node A, node C, and node X. Node X has forward links to node Z and node Y and back links from node B, node Z and node Y. Node Y has a forward link to node X and back links from node X and node B.

The scaled view 304 represents the expanded graph 302 as two groups: a first group 306 and a second group 308. The first group 306 comprises nodes A, B, and C, and the second group comprises nodes X, Y, and Z. The groups (306 and 308) are each enclosed in respective boxes (310 and 312). Each group box (310 and 312) includes a node count (upper left corner) for the nodes that are considered part of that group.

The boxes (310 and 312) are automatically interconnected with a forward link 314 and a back link 316 (called "arteries"). The forward link 314 is graphically emphasized (e.g., thicker arc than the arc for the back link 316) to indicate that multiple forward links connect from the nodes of the first group 306 to the nodes of the second group 308. It can be seen in the expanded graph 302 that four forward links extend from the first group 306 of nodes to the second group 308 of nodes, and one back link extends from the second group 308 of nodes to the first group 306 of nodes. Such "arteries" allow the user the ability to maintain a feel for the underlying detailed structure of the graph while employing grouping to hide complexity.

The forward link 314 also includes a link count (e.g., four) which indicates the number of links associated with the emphasized arc of the forward link 314. The back link 316 includes a back link count (e.g., one) to indicate the number of back links that exist between the second group of nodes 308 and the first groups of nodes 306.

The boxes (310 and 312) each include an expand/collapse icon 318 that toggles between expanded and collapsed views when selected. When in collapsed view, selection of the icon 318 expands the box to show all nodes of the group. The boxes (310 and 312) are shown in expanded mode.

It is to be understood that the graph 302 can be so large that portions of the graph are outside the viewing area of the user interface. In such instances graphics (e.g., animations) can be applied to links to show the general flow and direction of the link arrows that are off screen.

It is also within contemplation of the disclosed architecture that auto-collapsing and expanding can be performed based on scroll of the view relative to the viewing area.

Figure 4:
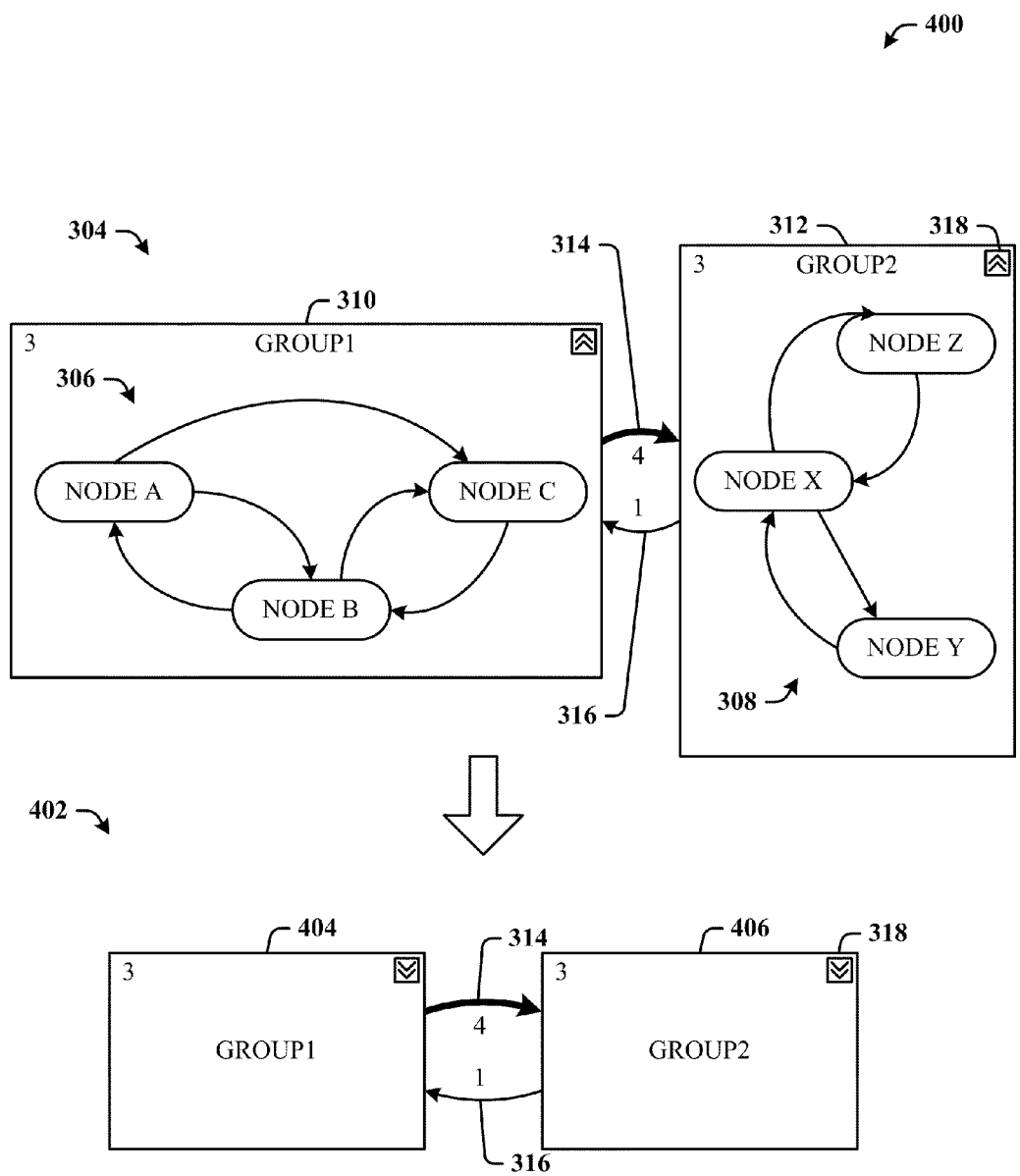
FIG. 4 illustrates a scaled view that further collapses the first and second groups of the expanded view into a collapsed group view.
Figure 5:
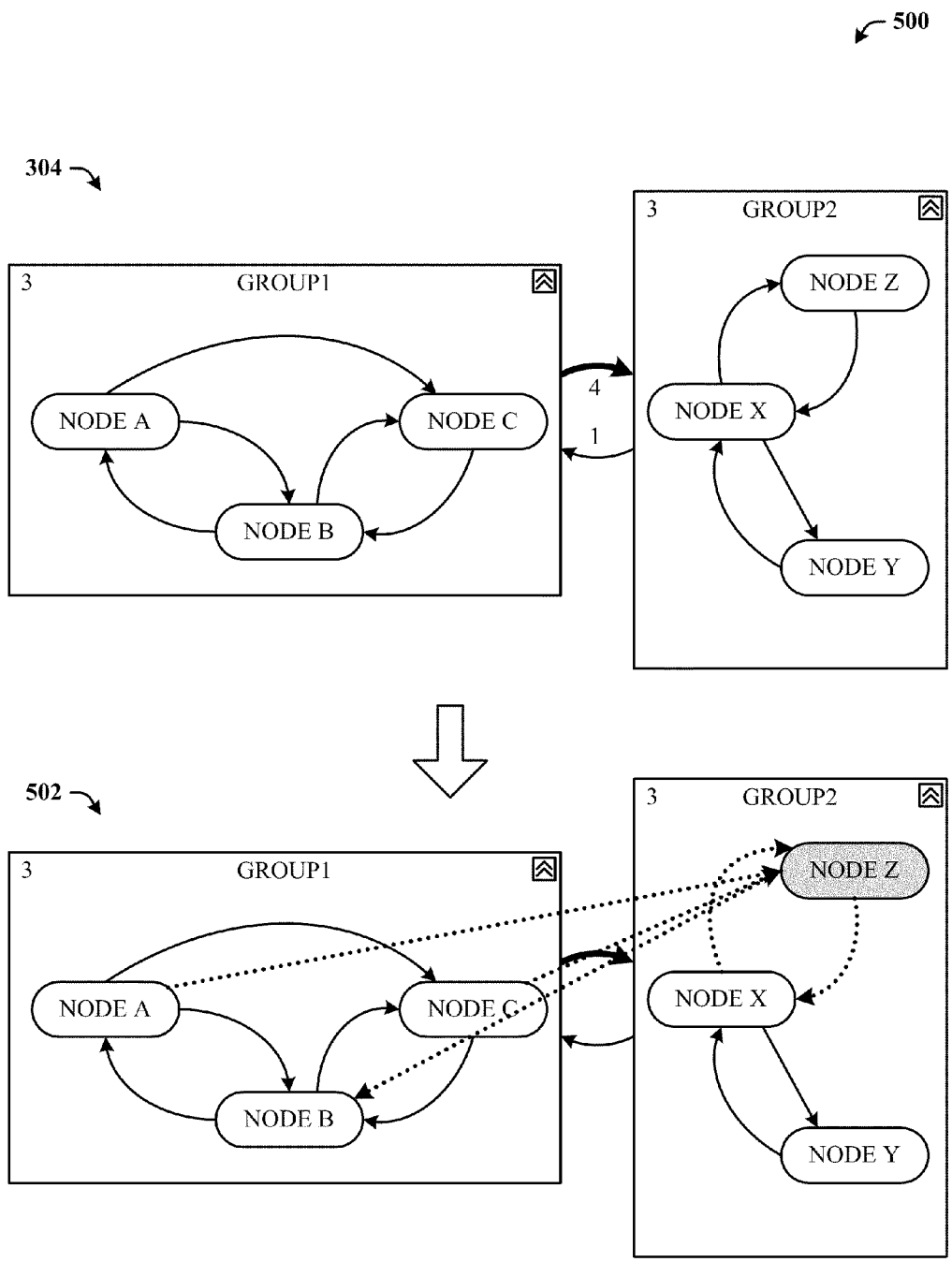
FIG. 5 illustrates a view of cross-group links overlayed on the graph for selected nodes.

FIG. 4 illustrates a scaled view 400 that further collapses the first and second groups (306 and 308) of the expanded view 304 into a collapsed group view 402. The collapsed group view 402 shows only two boxes (404 and 406), the group labeling for each box, and the interconnecting links: the forward link 314 (and forward link count) and back link 316 (and back link count).

FIG. 5 illustrates a view 500 of cross-group links overlayed on the graph for selected nodes. The view 500 transitions from the scaled view 304 to a cross-linked view 502 based on selection of node Z for link details. Once selected, the forward and back links for the selected node (node Z) are shown (here, as dotted and bolded). (Note that line emphasis is not limited to dotted, but can be colored, dashed, etc., or any format that differentiates from other line formats for easy viewing.) Here, the forward links to node B and node X and back links from node A, node C, and node X are shown and graphically emphasized (e.g., associated links are thicker, different color, different line type, etc.).

FIG. 6 illustrates a view 600 of nested grouping. The scaled view 304 transitions to the nested group view 602, where a nested group box 604 is created about nodes A and B. The nested group box 604 includes the expand/collapse icon, node count (now two), and group label (Group3). The parent group, first group box 310 adjusts to now show two a node count of two (for node C and the nested group box 604). Additionally, the links shown between the nested group box 604 and node C show a single forward link 606 from node C (dotted link) to the group box 604 and a back link 608 (dotted link) from the nested group box 604 to node C. Again, since the number of back links to node C is more than one, the back link 608 is graphically emphasized (e.g., thicker arc) to visually indicate that there are multiple back links (e.g., two), as indicated by the link counts.

FIG. 7 illustrates a scaled view 700 of a collapsed nested group and overlayed links. A transition from the nested group view 602 can be to further collapse the nested group box 604 into a collapsed nested group view 702 that shows the collapsed nested group box 704. The collapsed nested group box 704 shows only the group label (Group3) and the node count. A further selection of the collapsed nested group box 704 will display the forward/back links (as dotted links) to and from the second group 308 of nodes (nodes X, Z, and Y).

Figure 8:
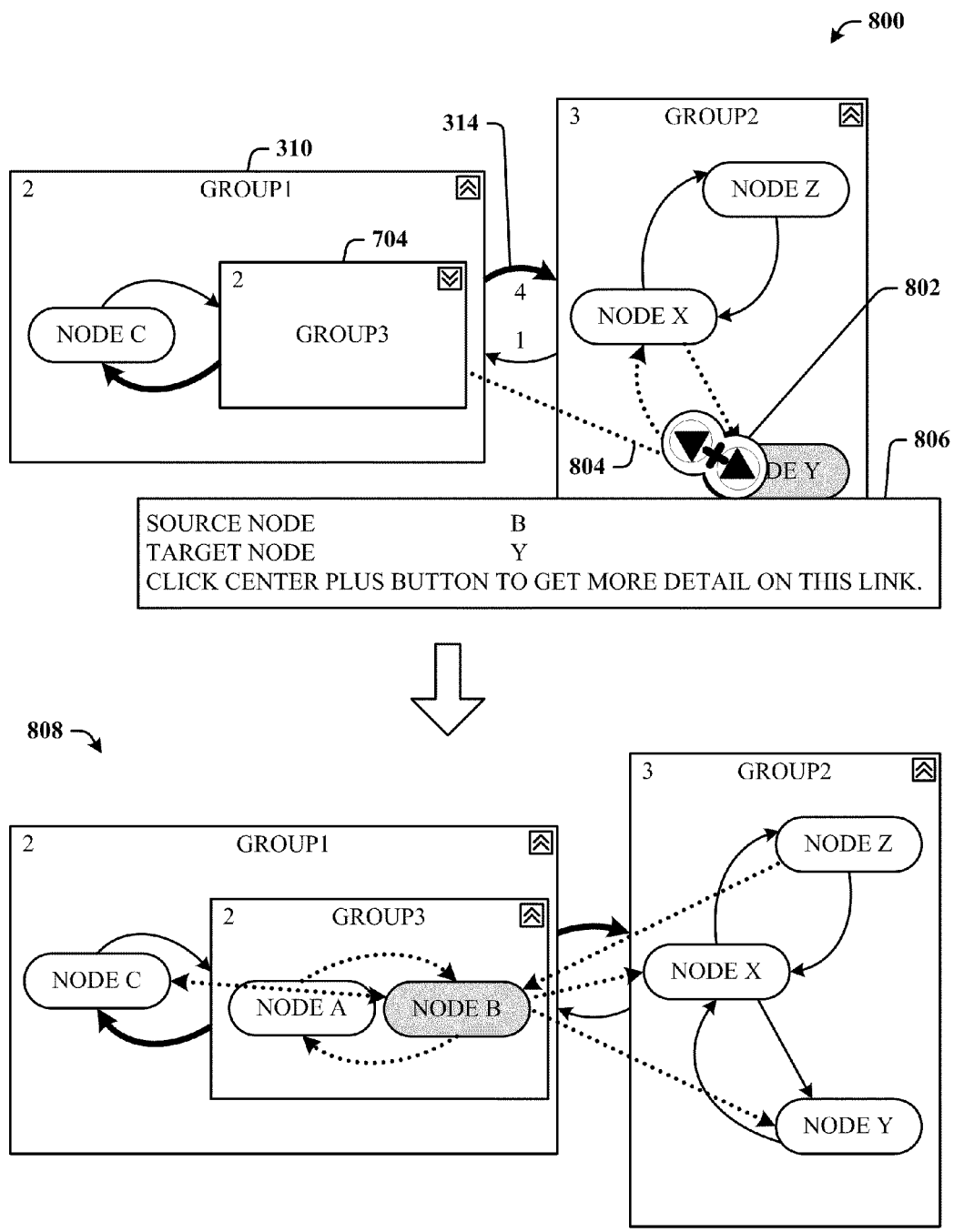
FIG. 8 illustrates a view that shows a link navigator tool for tracking a link source node and target node.

FIG. 8 illustrates a view 800 that shows a link navigator tool 802 for tracking a link source node and target node. Here, the node Y is selected for a link overlay view. However, since a back link 804 extends from the collapsed nested group 704 it is unclear from which node in the first group box 310 the back link 804 derives. Rather than expanding the graph, the tool 802 can be employed. By hovering (or moving) the tool 802 over the desired link (link 804), a popup information panel 806 is presented that shows the source and target node information and additional actions the user can take to obtain more options about the desired link 804 (if selecting an expansion graphic (+)). The tool 802 alleviates the need to expand a node and the graph partially or entirely to view the link dependencies.

The tool 802 also includes directional arrows. When selecting one directional arrow of the tool 802, the arrow pointing away from node Y, for example, the view automatically expands the minimum number of parent groups needed to expose node B, as shown in minimally expanded view 808 and the associated links (with dotted line emphasis). Additionally, a navigation history can be presented as code (not shown) that traces the user steps back through the graph.

The plus (+) icon can also be utilized to select (extract a union of) a subset of the nodes of the overall graph. For example, the tool 806 can be operated on a roll-up link (e.g., link 314) such that all links bundled in the roll-up link and associated nodes are copied for transfer to a new workspace as a new graph for viewing to expose all related nodes and the links. Thus, in addition to the drill-into group operation described above, the architecture also provides a drill-into link operation. Drill-into-link can also be implemented on the same canvas as a popup, or a temporary exploration which reverts back to the full graph when the user is done exploring that information.

It is to be understood that when grouping links and nodes, no underlying information is lost, and therefore is still available to be exposed on expansion. This applies similarly to capturing (copying) a link/group subset to another new graph—no underlying data is lost in the main graph because of this operation.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
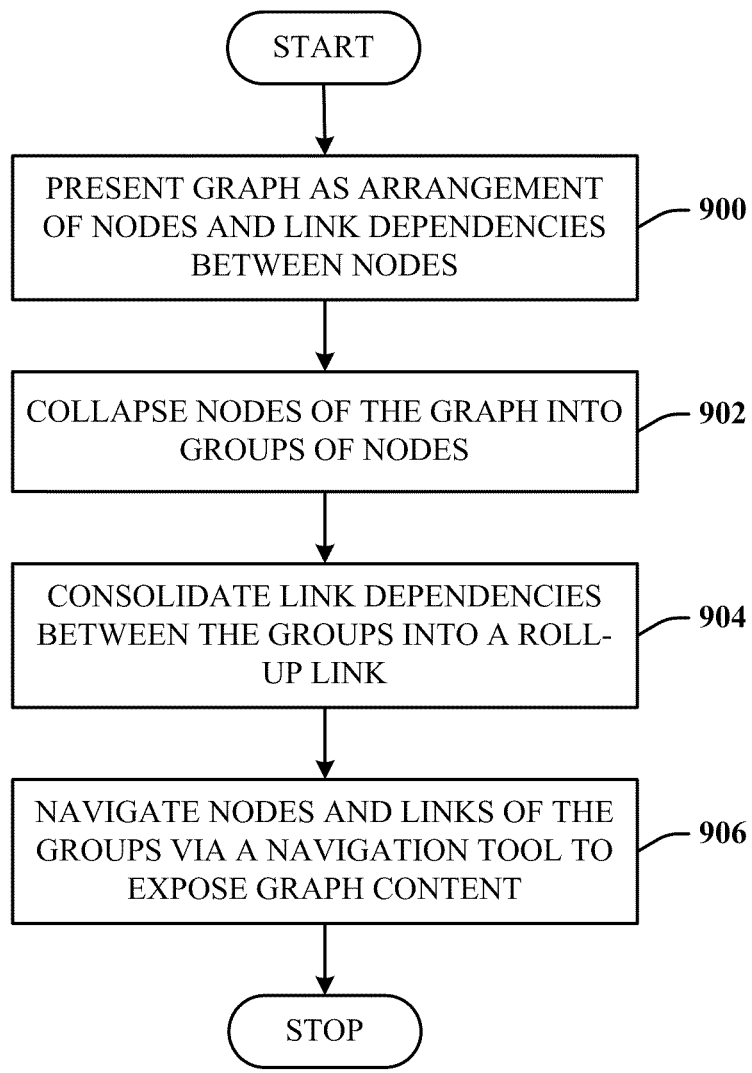
FIG. 9 illustrates a computer-implemented graph visualization method in accordance with the disclosed architecture.

FIG. 9 illustrates a computer-implemented graph visualization method in accordance with the disclosed architecture. At 900, a graph is presented as an arrangement of nodes and link dependencies between nodes. At 902, nodes of the graph are collapsed into groups of nodes. At 904, link dependencies between the groups are consolidated into a roll-up link. At 906, nodes and links of the groups are navigated via a navigation tool to expose graph content.

Figure 10:
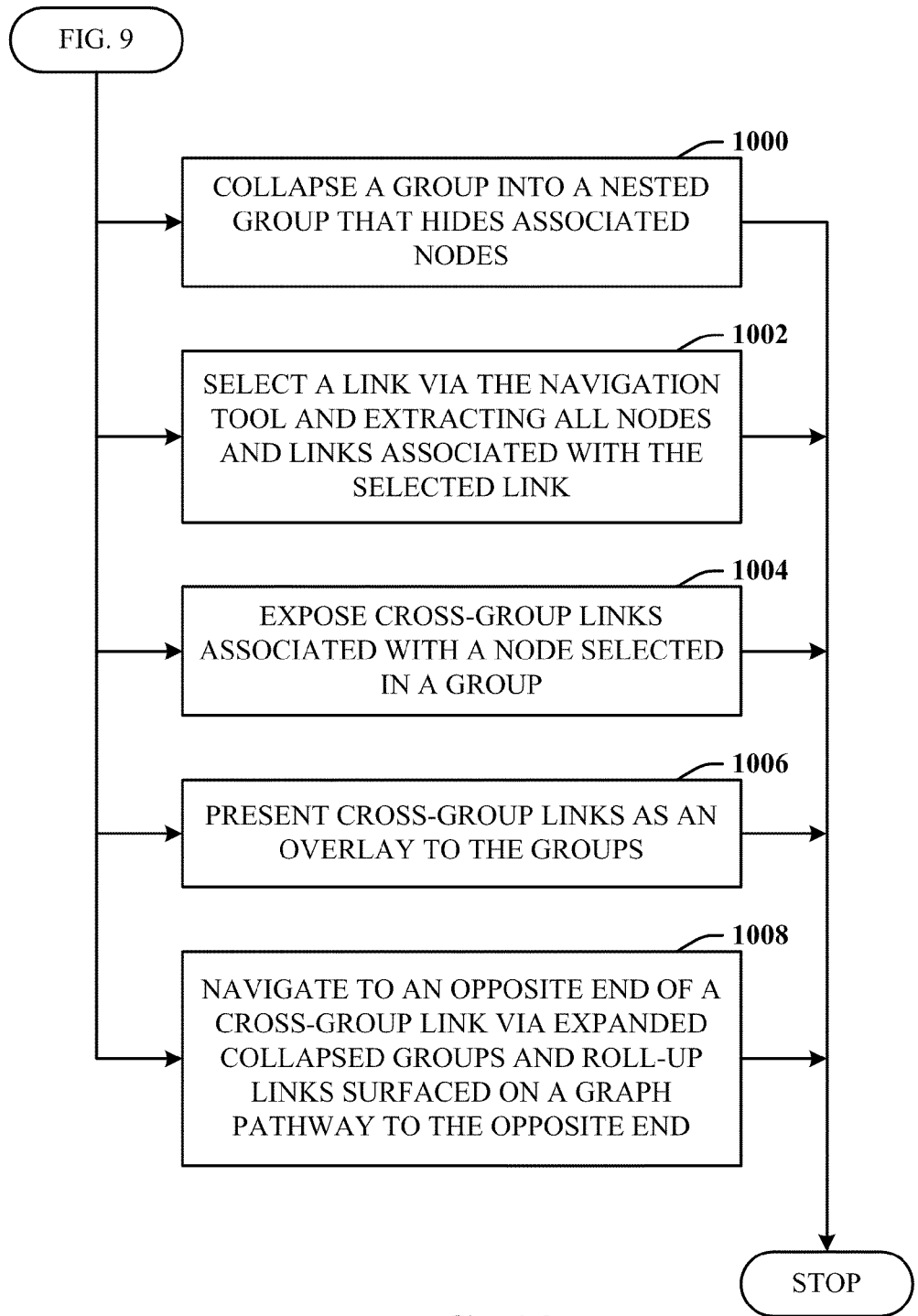
FIG. 10 illustrates further aspects of the method of FIG. 9.

FIG. 10 illustrates further aspects of the method of FIG. 9. At 1000, a group is collapsed into a nested group that hides associated nodes. At 1002, a link is selected via the navigation tool and all nodes and links associated with the selected link are extracted. At 1004, cross-group links associated with a node selected in a group are exposed. At 1006, cross-group links are presented as an overlay to the groups. At 1008, navigation to an opposite end of a cross-group link is performed via expanded collapsed groups and roll-up links surfaced on a graph pathway to the opposite end.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
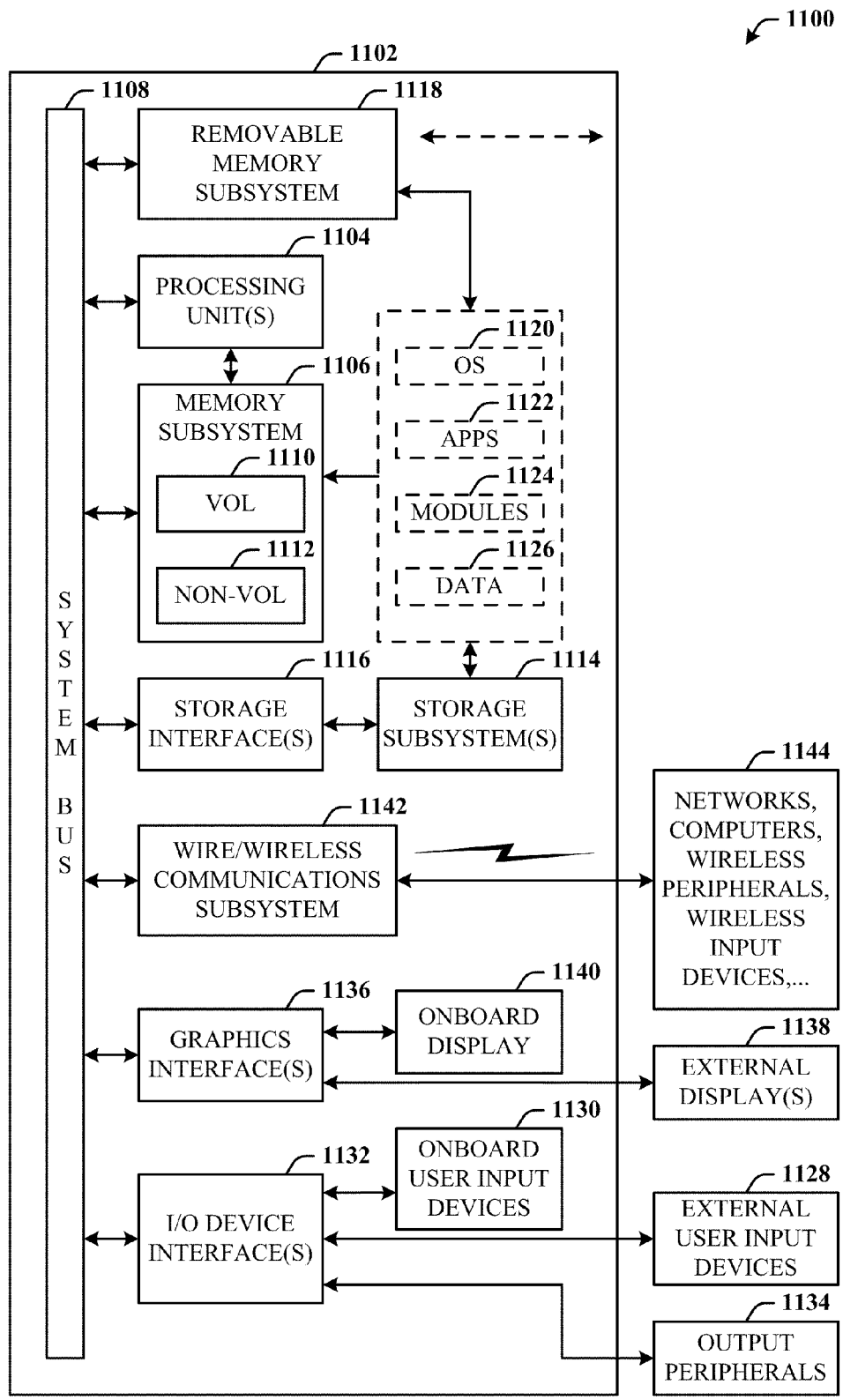
FIG. 11 illustrates a block diagram of a computing system that executes graph visualization in accordance with the disclosed architecture.

Referring now to FIG. 11, there is illustrated a block diagram of a computing system 1100 that executes graph visualization in accordance with the disclosed architecture. In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a computer-readable storage such as a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include computer-readable storage (physical storage media) such as a volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The one or more application programs 1122, other program modules 1124, and program data 1126 can include the entities and components of the system 100 of FIG. 1, the entities and components of the system 200 of FIG. 2, the capabilities to provide the scaled views of FIGS. 3-8, and the methods represented by the flowcharts of FIGS. 9-10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1102 and includes volatile and non-volatile internal and/or external media that is removable or non-removable. For the computer 1102, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/ wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented graph visualization system, comprising:
   a computer comprising a processing unit coupled to a memory, the memory storing executable instructions comprising:
     a graph visually presented via a user interface, the graph presented as an arrangement of nodes and links between the nodes visually represented in a view via a user interface, the links comprising a forward link and a back link;
     a scaling component that incrementally scales the view of the graph based on operations on the nodes and the links, the operations include collapse of nodes into groups and links into roll-up links and expansion of the groups and the roll-up links, wherein the scaling component graphically replaces links between a node and a group or between groups with a roll-up link that visually conveys dependency between the node and the group or between the groups with a visually-displayed thickness of the roll-up link indicative relatively of a quantity of dependencies that exist in a given direction and a link count value which indicates the quantity of dependencies that are represented by the roll-up link; and
     a navigation tool that facilitates incremental access to collapsed content and update of the graph view of expanded content, when the navigation tool is hovered over a desired link, an information panel is presented that displays source and target node information and an additional action a user can take to obtain an additional option about the desired link.

2. The system of claim 1, wherein the scaling component associates a group of nodes with a group graphic that circumscribes the nodes, a group label, a node count value, and an expansion operator to expand the group of nodes.

3. The system of claim 2, wherein the scaling component enables further collapse of the group of nodes into a box that hides the associated nodes, the box includes the group label, and associated links.

4. The system of claim 2, wherein the scaling component enables nested group of nodes of the group of nodes, the nested group of nodes having a nested group label and associated roll-up link.

5. The system of claim 1, wherein the scaling component presents cross-group links based on selection of a node in a group of the cross-groups.

6. The system of claim 1, wherein the navigation tool facilitates exposure of only collapsed nodes and roll-up links relative to a selected node.

7. The system of claim 1, wherein the navigation tool facilitates creation of an updated visualization based on extraction of nodes and links relative to selection of a link or a node.

8. The system of claim 1, the memory further storing executable instructions comprising:
   presenting a navigation history as code that traces a user back through the graph.

9. A computer-implemented graph visualization system, comprising:
   a computer comprising a processing unit coupled to a memory, the memory storing executable instructions comprising:
     a graph visually presented via a user interface, the graph presented as an arrangement of nodes and links between the nodes visually represented via a user interface, the links comprising a forward link and a back link;
     a scaling component that incrementally scales the graph based on operations on the nodes and the links, the operations include collapse of nodes into groups and links into roll-up links and expansion of the groups and the roll-up links, wherein the scaling component graphically replaces links between a node and a group or between groups with a roll-up link that visually conveys dependency between the node and the group or between the groups with a visually-displayed thickness of the roll-up link indicative relatively of a quantity of dependencies that exist in a given direction and a link count value which indicates the quantity of dependencies that are represented by the roll-up link; and a navigation tool that facilitates incremental access to collapsed content and update of the graph relative to exposed content, when the navigation tool is hovered over a desired link, an information panel is presented that displays source and target node information and an additional action a user can take to obtain an additional option about the desired link.

10. The system of claim 9, wherein the scaling component associates a group of nodes with a group graphic that circumscribes the nodes, a group label, a node count value, and an expansion operator to expand the group of nodes, and enables further collapse of the group of nodes into a box that hides the associated nodes, the box includes the group label, and associated links.

11. The system of claim 9, wherein the scaling component enables nested groups of nodes of the group of nodes, the nested group of nodes having a nested group label and associated roll-up link, the scaling component presents cross-group links of cross-groups and nested groups based on selection of a node in a group of the cross-groups or nested group.

12. The system of claim 9, wherein the navigation tool facilitates exposure of only collapsed nodes and roll-up links relative to a selected node and creation of a new graph based on extraction of nodes and links relative to selection of a link or a node.

13. The system of claim 9, the memory further storing executable instructions comprising:
providing a navigation history so that a user can retrace user steps back through the graph.

14. A computer-implemented graph visualization method executable via a processor, comprising:

presenting a graph as an arrangement of nodes and link dependencies between nodes, the links comprising a forward link and a back link;

collapsing, by the processor, nodes of the graph into groups of nodes;

consolidating, by the processor, link dependencies between the groups into a roll-up link, wherein hovering over the roll-up link causes link information to be presented; and navigating nodes and links of the groups via a navigation tool to expose graph content, wherein when the navigation tool is hovered over a desired link, an information panel is presented that displays source and target node information and an additional action a user can take to obtain an additional option about the desired link.

15. The method of claim 14, further comprising collapsing a group into a nested group that hides associated nodes.

16. The method of claim 14, further comprising selecting a link via the navigation tool and extracting all nodes and links associated with the selected link.

17. The method of claim 14, further comprising exposing cross-group links associated with a node selected in a group.

18. The method of claim 14, further comprising presenting cross-group links as an overlay to the groups.

19. The method of claim 14, further comprising navigating to an opposite end of a cross-group link via expanded collapsed groups and roll-up links surfaced on a graph pathway to the opposite end.

* * * * *